(12) United States Patent
Cooke et al.

(10) Patent No.: US 11,387,680 B2
(45) Date of Patent: *Jul. 12, 2022

(54) CORELESS POWER TRANSFORMER

(71) Applicant: MASSACHUSETTS INSTITUTE OF TECHNOLOGY, Cambridge, MA (US)

(72) Inventors: Chathan M. Cooke, Belmont, MA (US); Angel J. Carvajal, New York, NY (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/165,008

(22) Filed: Feb. 2, 2021

(65) Prior Publication Data

US 2021/0159734 A1    May 27, 2021

Related U.S. Application Data

(63) Continuation of application No. 16/283,911, filed on Feb. 25, 2019, now Pat. No. 10,951,064.

(60) Provisional application No. 62/636,277, filed on Feb. 28, 2018.

(51) Int. Cl.
*H02J 50/12* (2016.01)
*H01F 38/14* (2006.01)
*H01F 27/28* (2006.01)

(52) U.S. Cl.
CPC .......... *H02J 50/12* (2016.02); *H01F 27/2823* (2013.01); *H01F 38/14* (2013.01); *H01F 2038/146* (2013.01)

(58) Field of Classification Search
CPC ...... H02J 50/12; H01F 27/2823; H01F 38/14; H01F 2038/146
See application file for complete search history.

(56) References Cited

U.S. PATENT DOCUMENTS

| 7,622,891 B2 * | 11/2009 | Cheng | H02J 50/10 320/108 |
| 8,400,788 B2 | 3/2013 | Hansson | |
| 8,482,157 B2 | 7/2013 | Cook et al. | |

(Continued)

FOREIGN PATENT DOCUMENTS

WO    2007008646 A2    1/2007

OTHER PUBLICATIONS

Kim, "Range-Adaptive Wireless Power Transfer Using Multiloop and Tunable Matching Techniques," IEEE Transactions on Industrial Electronics, vol. 62, No. 10, Oct. 2015, pp. 6233-6241 (Year: 2015).*

(Continued)

*Primary Examiner* — Pinping Sun
(74) *Attorney, Agent, or Firm* — Gesmer Updegrove LLP

(57) ABSTRACT

A transformer system is provided that includes four magnetically coupled coils having fixed spacing geometry. The four magnetically coupled coils include a drive coil that produces magnetic fields and a load coil. All coils are coupled in the transformer system, but the first resonant coil is highly coupled with the drive coil so that the resonant coil can receive energy from the drive coil and the second resonant coil is highly coupled to the load coil so that the load coil can extract energy efficiently from the second resonant coil.

14 Claims, 7 Drawing Sheets

(56) References Cited

U.S. PATENT DOCUMENTS

| | | | |
|---|---|---|---|
| 9,061,216 B1* | 6/2015 | Hooper | A63H 3/006 |
| 9,312,063 B2 | 4/2016 | Bohori et al. | |
| 9,350,196 B2* | 5/2016 | Uchida | B60L 3/12 |
| 10,044,227 B2 | 8/2018 | Chappell et al. | |
| 10,063,085 B2 | 8/2018 | Bae | |
| 10,951,064 B2* | 3/2021 | Cooke | H01F 38/14 |
| 2009/0051224 A1 | 2/2009 | Cook | |
| 2010/0244583 A1* | 9/2010 | Shimokawa | H02J 50/90 |
| | | | 307/104 |
| 2011/0115430 A1 | 5/2011 | Saunamaki | |
| 2012/0286584 A1 | 11/2012 | Park | |
| 2014/0028112 A1 | 1/2014 | Hui | |
| 2014/0167524 A1 | 6/2014 | Oodachi et al. | |
| 2015/0001950 A1* | 1/2015 | Chung | H02J 50/005 |
| | | | 307/104 |
| 2016/0056640 A1* | 2/2016 | Mao | H02J 50/80 |
| | | | 307/104 |
| 2016/0072306 A1* | 3/2016 | Tsuda | H02J 50/402 |
| | | | 307/104 |
| 2016/0172104 A1* | 6/2016 | Mirbozorgi | H02J 7/025 |
| | | | 320/108 |
| 2017/0338696 A1* | 11/2017 | Bae | H02J 50/00 |
| 2017/0358392 A1* | 12/2017 | Zhang | H01F 27/34 |
| 2020/0303958 A1* | 9/2020 | Tanii | H02J 50/80 |
| 2021/0328462 A1* | 10/2021 | Cooke | H01F 38/14 |

OTHER PUBLICATIONS

Kim, "Loop Switching Technique for Wireless Power Transfer Using Magnetic Resonance Coupling," Progress In Electromagnetics Research, vol. 138, 2013, pp. 197-209 (Year: 2013).*

International Preliminary Report on Patentability issued in related PCT Application No. PCT/US2019/019338 dated Sep. 1, 2020.

International Search Report and Written Opinion issued in related PCT Application No. PCT/US2019/019338 dated May 3, 2019.

Vaisambhayana, "State of Art Survey for Design of Medium Frequency High Power Transformer", 2016 Aian Conference on Energy, Power and Transportation Electrification (ACEPT).

Supplementary European Search Report issued in related EP Application No. 19761469.6 dated Nov. 16, 2021.

Hui S Y Ron, "Magnetic Resonance for Wireless Power Transfer [A Look Back]," IEEE Power Electronics Magazine, IEEE, USA, vol. 3, No. 1, Mar. 1, 2016, pp. 14-31, XP011609287, ISSN: 2329-9207, DOI: 10.1109/MPEL.20152510441. (Abstract).

* cited by examiner

CORELESS POWER TRANSFORMER

PRIORITY INFORMATION

This application is a continuation of U.S. Ser. No. 16/283,911 filed Feb. 25, 2019, which claims priority from provisional application Ser. No. 62/636,277 filed Feb. 28, 2018, which is incorporated herein by reference in its entirety.

BACKGROUND OF THE INVENTION

The invention relates to the field of power transformers, and in particular to coreless power transformers.

The transformer has been a pivotal device in the large-scale transmission and delivery of electrical energy since its commercial success in the late 1800s. Its official conception dates back to May 1885, when three young engineers of the Hungarian Ganz factory, Zipernowsky, and associates, demonstrated what is generally considered to be the prototype of today's lighting systems. They were able to illuminate the Industrial Exhibition of Budapest-1,067 60 V incandescent lamps-via 75 toroidal, iron core transformers connected in parallel to a 1350 V AC generator. Shortly after, William Stanley modified the Hungarian design for ease of manufacturing and costs and founded the "Stanley Transformer," which demonstrated step-up/step-down capabilities and electrified downtown Great Barrington, Mass. What followed were decades of expansion in AC electric power systems through the 20th century as electricity and transformers became a critical part of the economic infrastructure of most industrialized nations. Transformers increased in size and power rating, with large units used for the power transmission grid and vastly more, smaller units used in the electric power distribution system.

The basic physical principles of transformers remain the same today as they were 130 years ago, though efficiency, costs, weight, versatility, and dimensions have drastically improved. Today's transformers can operate up to the megavolt level and handle more than a million kVA with lifetimes of 25-40 years. However, transformers present a considerable expense to power companies due to their high costs and weight associated with their required steel core and copper windings. Additionally, the U.S. has spent an average of $800 million in importing large power transformers per year in the last five years. Therefore, although the steel core has been a staple in transformer engineering for years, perhaps a radically different design could mitigate the climbing costs of these indispensable devices.

SUMMARY OF THE INVENTION

In one embodiment, the present invention provides a transformer system comprising: four magnetically coupled coils have fixed spacing geometry comprising a drive coil, a load coil, a first resonant coil of length $X2$, and a second resonant coil of length $X2$, wherein the following six magnetic couplings exist between the four magnetically coupled coils: a first magnetic coupling between the drive coil and the first resonant coil, a second magnetic coupling between the first resonant coil and the second resonant coil, a third magnetic coupling between the second resonant coil and the load coil, a fourth magnetic coupling between the drive coil and the second resonant coil, a fifth magnetic coupling between the first resonant coil and the load coil, and a sixth magnetic coupling between the drive coil and the load coil; wherein the drive coil producing magnetic fields and the first resonant coil being magnetically coupled to the drive coil producing energy that is stored by the first resonant coil and the second resonant coil being magnetically coupled to the first resonant coil to propagate the energy stored in the first resonant coil to the second resonant coil without using a magnetic core, wherein the second resonant coil is then magnetically coupled to the load coil where the energy is transferred to the load coil, and wherein a first scaling parameter $f1$ is used to characterize a first variation position where the drive coil is wrapped around the first resonant coil, and a second scaling parameter $f2$ is used to characterize a second variation position where the load coil is wrapped around the second resonant coil, and the first scaling parameter $f1$ and the second scaling parameter $f2$ are defined as: $f1=d1/X2$ and $f2=d2/X2$, where $d1$ represents a first distance between a first center position of the drive coil and a first edge of the first resonant coil and $d2$ represents a second distance between a second center position of the load coil and a second edge of the first resonant coil, wherein any of, or a combination of, a group of parameters are picked to achieve a pre-defined transmission coefficient, and the group of parameters are the first center position, the second center position, a separation distance between the first resonant coil and the second resonant coil, a number of turns in the first resonant coil, a number of turns in the second resonant coil, a number of turns in the drive coil, and a number of turns in the load coil, wherein the first magnetic coupling between the drive coil and the first resonant coil is higher than the fourth magnetic coupling between the drive coil and the second resonant coil and the sixth magnetic coupling between the drive coil and the load coil; and wherein the third magnetic coupling between the second resonant coil and the load coil is higher than the fifth magnetic coupling between the load coil and the first resonant coil and the sixth magnetic coupling between the load coil and the drive coil.

In another embodiment, the present invention provides a method comprising: providing four magnetically coupled coils have fixed spacing geometry comprising a drive coil, a load coil, a first resonant coil of length $X2$, and a second resonant coil of length $X2$, wherein the following six magnetic couplings exist between the four magnetically coupled coils: a first magnetic coupling between the drive coil and the first resonant coil, a second magnetic coupling between the first resonant coil and the second resonant coil, a third magnetic coupling between the second resonant coil and the load coil, a fourth magnetic coupling between the drive coil and the second resonant coil, a fifth magnetic coupling between the first resonant coil and the load coil, and a sixth magnetic coupling between the drive coil and the load coil; producing magnetic fields using the drive coil; magnetically coupling the first resonant coil to the drive coil producing energy that is stored by the first resonant coil; magnetically coupling the second resonant coil to the first resonant coil to propagate the energy stored in the first resonant coil to the second resonant coil without using a magnetic core, wherein the second resonant coil is then magnetically coupled to the load coil where the energy is transferred to the load coil, and wherein a first scaling parameter $f1$ is used to characterize a first variation position where the drive coil is wrapped around the first resonant coil, and a second scaling parameter $f2$ is used to characterize a second variation position where the load coil is wrapped around the second resonant coil, and the first scaling parameter $f1$ and the second scaling parameter $f2$ are defined as: $f1=d1/X2$ and $f2=d2/X2$, where $d1$ represents a first distance between a first center position of the drive coil and a first edge of the first resonant coil and $d2$ represents a second distance between a second center position of the load coil and a second edge of the first resonant coil, wherein any of, or a combination of, a group of parameters are picked to achieve a pre-defined transmission coefficient, and the group of parameters are the first center position, the second center position, a separation distance between the first resonant coil and the second resonant coil, a number of turns in the first resonant coil, a number of turns in the second resonant coil, a number of turns in the drive coil, and a number of turns in the load coil, wherein the first magnetic coupling between the drive coil and the first resonant coil is higher than the fourth magnetic coupling between the drive coil and the second resonant coil and the sixth magnetic coupling between the drive coil and the load coil; and wherein the third magnetic coupling between the second resonant coil and the load coil is higher than the fifth magnetic coupling between the load coil and the first resonant coil and the sixth magnetic coupling between the load coil and the drive coil.

DETAILED DESCRIPTION OF THE INVENTION

The invention involves a system and method of efficiently transferring power without a magnetic core to guide the magnetic flux between coupling coils. The invention includes a pair of coupled resonant coils as well as two more coils, one to couple energy into and the other to couple energy out-from the resonant-pair. The addition of a drive coil and load coil can aid in impedance matching and step-up/step-down capabilities. The drive coil is inductively coupled to the first coil of the resonant pair. The load coil is inductively coupled to the second coil of the resonant pair. In total, there are four coils used with the objective of transferring power to the load. Importantly, these four magnetically coupled coils have fixed spacing geometry. However, the coupling between the coils is not simple. Due to the coil positions, all coils are coupled to all other coils, and there is substantial interdependence of coil coupling that needs to be considered in overall transformer performance.

Since coils in resonance transfer energy to each other more efficiently, resonant coils can be tuned to the frequency of interest by connection of the appropriate resonant capacitor. This enables a designer to decide and alter the resonating frequency of these coils via an external element. What has been effectively created is a 4-coil transformer system 10.

Figure 1:
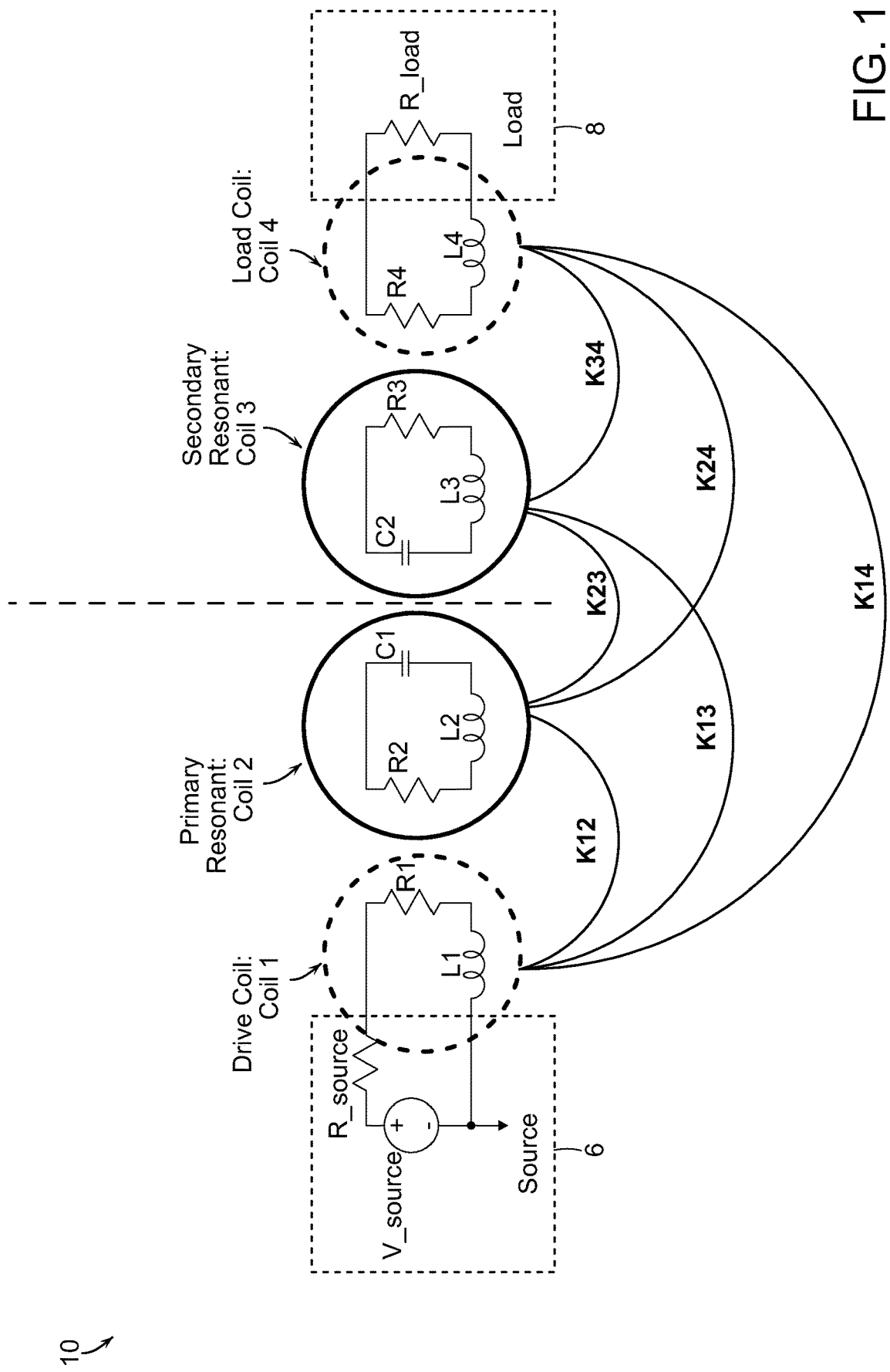
FIG. 1 is a schematic diagram illustrating lump circuit representation of the inventive 4-coil coreless transformer.

The inventive 4-coil system 10 includes a source voltage (V_source) with source impedance (R-source) denoted by a source element 6, two resonant coils denoted as primary resonant coil 2 and secondary resonant coil 3, a drive coil 1, and a load coil 4 is connected to the output load impedance (R_load) defined by a load 8, as shown in FIG. 1. Each coil 1-4 is represented by its lumped series inductance L1, L2, L3, L4 resistance circuit equivalent R1, R2, R3, R4, respectively. The resonant coils 2, 3 include their coil and a parallel-connected lumped capacitor C1, C2. When an HF signal powers the drive coil 1, the resulting magnetic field excites the primary resonant coil 2, which stores energy in the same manner as an LC tank. The magnetic field of drive coil 1 also influences the secondary resonant coil 3 and the load coil (though not to the same degree). The critical interaction occurs between the two resonant coils which, act as near ideal low loss resonators and work to propagate the energy between them. The secondary resonant coil is then inductively coupled to the load coil where power will be transferred over to the loading device.

For a set of N coils in close proximity to each other, there will be (N−1) factorial coupling coefficients that describe the overall magnetic linkages between all the coils. Therefore, because there are 4-coils in this system, there are six coupling coefficients that are determined by the geometry of each coil and their relative position to one another: $K_{12}$, $K_{23}$, $K_{34}$, $K_{13}$, $K_{24}$, and $K_{14}$. Each $K_{xy}$ refers to the coupling coefficient between Coil-X and Coil-Y. FIG. 1 depicts this lumped equivalent circuit and the corresponding magnetic coupling coefficients. There are a plethora of design options in physically placing the four coils in these systems.

The four coils can be positioned in space in a multitude of ways. The resonant coils can be placed outside of the drive and load coils or nested within their respective drive/load coil, or all coils can even be nested inside of each other.

As stated earlier, all coils are coupled in the 4-coil system and the goal is to transfer power efficiently from the drive coil to the load coil.

Figure 2:
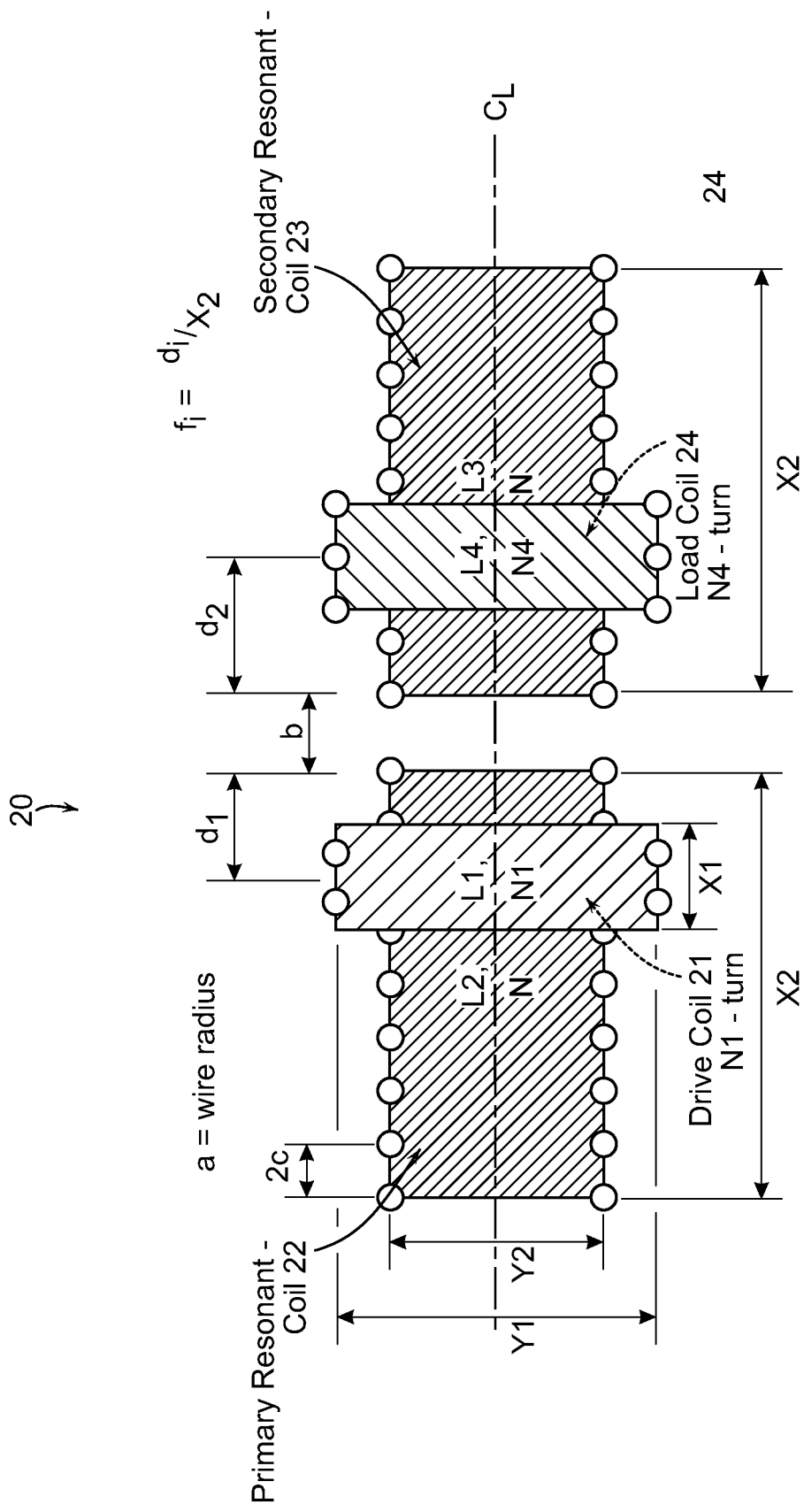
FIG. 2 is a schematic diagram illustrating the inventive 4-coil coreless transformer system with nested coils.

FIG. 2 shows a schematic diagram illustrating an example of the 4-coil system 20 used in accordance with the invention. It is desirable to have the drive coil 21 highly coupled to the primary resonant coil 22, so the primary resonant coil 22 can receive energy from the drive coil 21 (by having a higher k value associated with their coupling). The same goes for coil 23 and coil 24. The load coil 24 extracts energy from the secondary resonant coil 23. To enhance coupling, the coils 23 and 24 should be close proximity or nested within each other. If two coils are nested within each other, then higher theoretical k values can be achieved if the longer coil is nested within, the shorter coil. Consider the drive 21 and load 24 coils to be smaller than their respective resonant coils 22, 23 and thus, consider wrapping the drive/load coils around their resonant coils. The drive coil 21 has a diameter of Y1 and a length of X1 while the primary resonant coil 22 has a diameter Y2 and length X2. The drive coil 21 includes N1 turns of a wire element, and load coil has N4 turns of the wire element. While primary resonant coil 22 and secondary resonant coil 23 both have N turns of the wire element. Also, the distance between the primary resonant coil 22 and secondary resonant coil 23 is the distance b.

The positions where the load and drive coils are wrapped around their resonant coil are important to the high-efficiency operation. To better quantify this variation of the topology, normalized scaling parameters f1 and f2 have been defined. They correspond to the fractional position d1, d2 of the drive 21 and load coils 24 normalized by the length X2 of their corresponding resonant coils 22, 23. Starting from the turn closest to the center of the arrangement, the f1 and f2 values are the center position of the drive and load coils divided by the length of their respective resonant coils. Therefore, an assembly with f1=0.5 and f2=1 means the drive coil is centered upon the center of the primary resonant coil, and the load coil is centered upon the turn furthest away from the primary resonant coil. In FIG. 2, these f values are approximately f1=0.3 and f2=0.35. All subsequent 4-coil designs can follow this construction scaling.

The invention considers operating frequencies between typically above 100 kHz, for example, 175 kHz and 225 kHz. It is preferable to have the resonant coil's capacitors to be relatively small since smaller capacitors tend to have lower losses. Hence, capacitors of 10 nF are used based on the source impedance being 1 ohm and load impendence being 16 ohms. Given the frequency range selected, the lower limit on the inductances of the coils is 40 µH. As the coils get larger, they have higher inductances and experience higher losses. Therefore, the highest inductance achieved in the coils is a function of power loss. The windings losses have been chosen to be 2% of the total power: 2 watts, or less. Due to this constraint, the coil inductances have up to 80 µH. The parameters of frequency and current were inputted and computed for an assumed outer diameter of 8.75 in, a wire diameter of 0.125 in., and the center-to-center spacing over the radius of the wire ($2c/a$) values in the range of 3.4 to 4.4. These coil dimensions were chosen for power handling and construction convenience. Coils of a larger wire diameter make the wires harder to bend but less lossy, and larger coil diameters require fewer turns to achieve similar inductances. While smaller wire diameters have higher resistances and smaller coil diameters, they need more turns to make the same inductance.

Figure 3A:
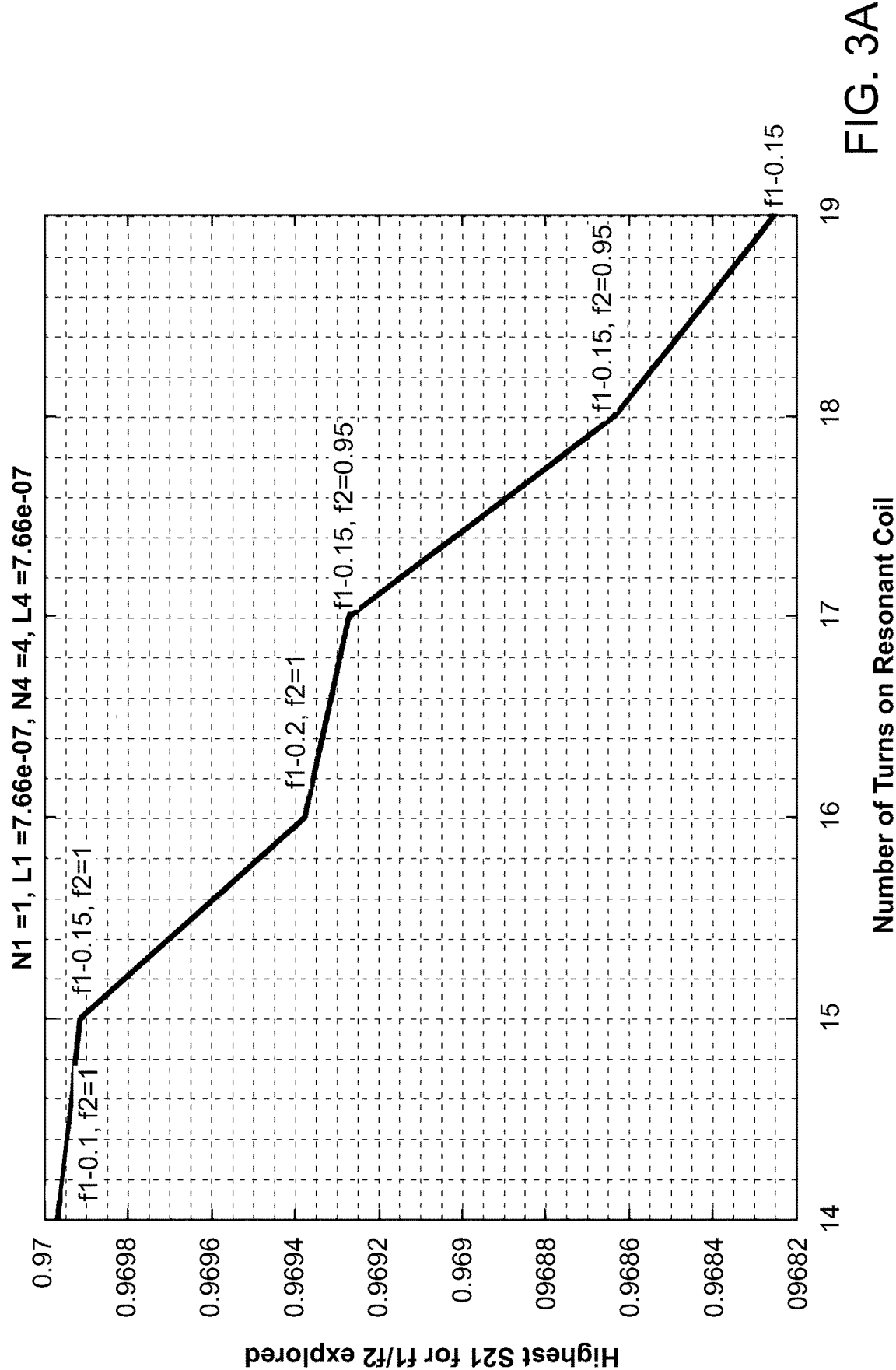
FIGS. 3A-3B are schematic diagrams illustrating the performance of a 1 turn drive coil and 4 turn load coil compared to 2 turn drive coil and 4 turn load coil.
Figure 3B:
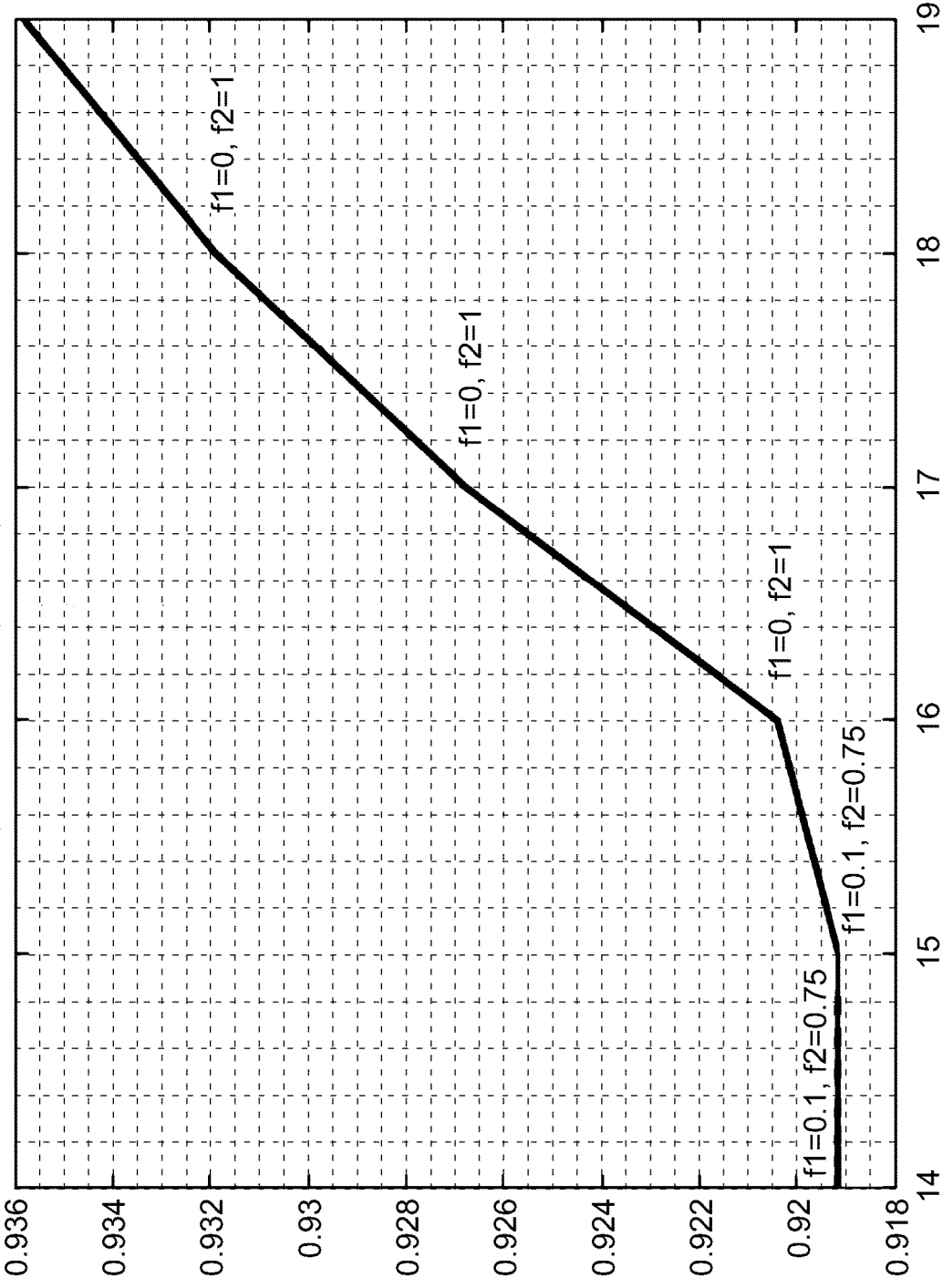

A MATLAB program was used to simulate the results of varying the number of turns on the load and drive coils with resonant coils ranging from 14 to 19 based on user defined parameters. In an exemplary embodiment, these combinations were made with f1 ranging between 0 and 0.25 and f2 ranging from 0.75 to 1, as these configurations had the highest efficiencies observed. Combinations of drive coils having up to 3 turns and the load coils up to 8 were attempted, as going any higher for either, or reversing the ratio would result in reduced performance. The key features include keeping the peak frequencies near the desired operating frequency of 200 kHz and their corresponding transmission coefficient ($S_{21}$) magnitude above 0.95. A drive coil of 1 turn and a load coil of 4-turns, and the resulting plots are shown in FIG. 3A. A reduced performance configuration, with a 2-turn drive and 4-turn load, is shown in FIG. 3B for comparison.

Figure 4:
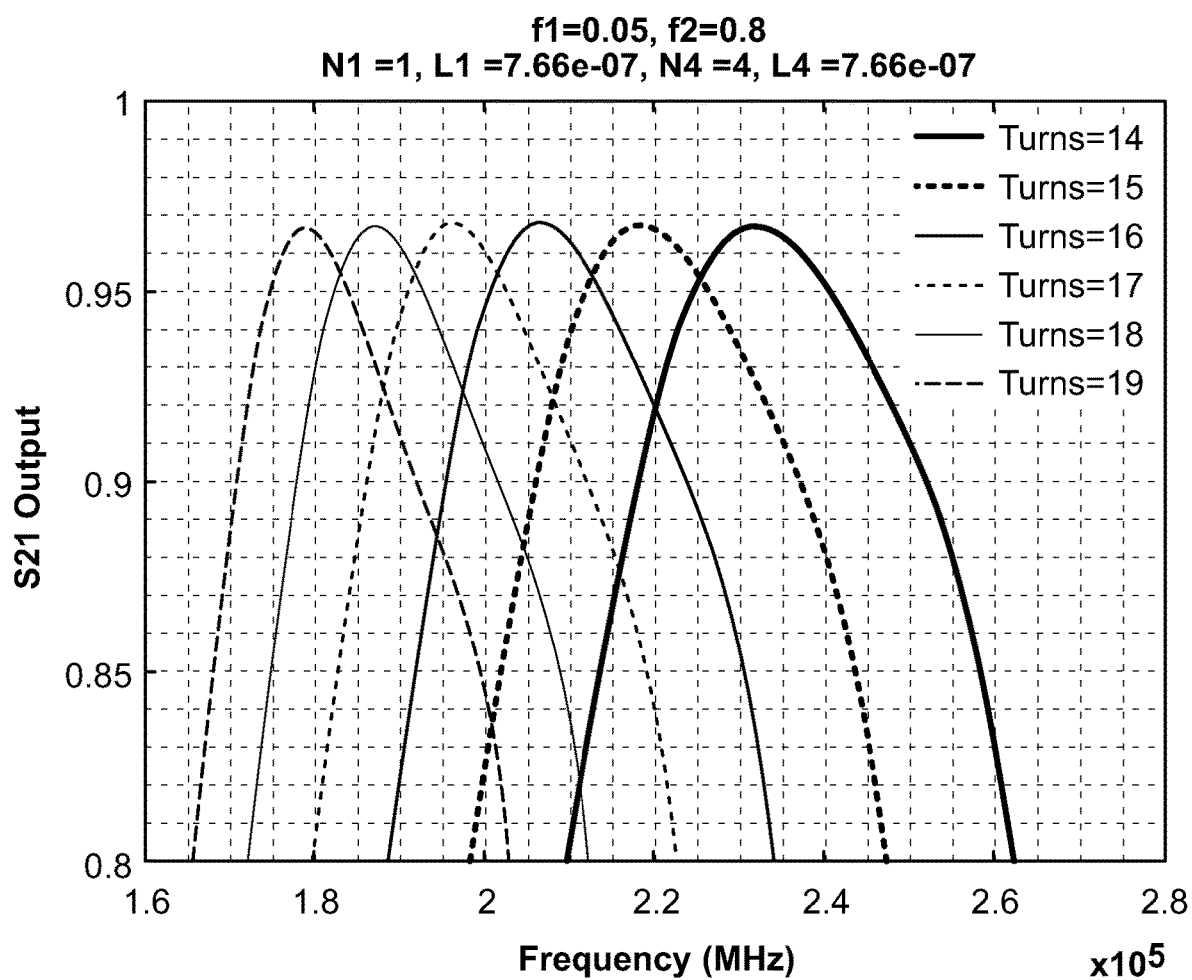
FIG. 4 is a schematic diagram illustrating a plot of the optimum transmission coefficient ($S_{21}$) peaks associated with a 1-turn drive coil and 4-turn load coils.

In this embodiment of the invention, the drive coil and load coil have been decided to be 1 and 4 turns respectively, the amount of turns on the resonant coils is evaluated next. In other embodiments of the invention, the drive coil and the load coil can have different number of turns based on the source impedance and load impedance. The MATLAB program will be configured to run at different f1 and f2 values in order to obtain adequate $S_{21}$ values. During each run, not only does the maximum $S_{21}$ have to be noted, but also the frequency and shape of the curves plotted. Since this is going to be driven by a power amplifier that must be tuned to the circuit, having a broader single peak is preferable than a thin spike. By running many simulations, a resonant coil of 18-turns with a spacing of f1=0.05 and f2=0.8 has been selected for the design due to its shape, high peak $S_{21}$ value, and lower frequency needed to achieve its maximum value. FIG. 4 shows the final results with the decided f1 and f2 value. The choice of 18-turns was also determined with the intention of the flexibility to reduce the number of turns to achieve flexibility in future designs.

Figure 5A:
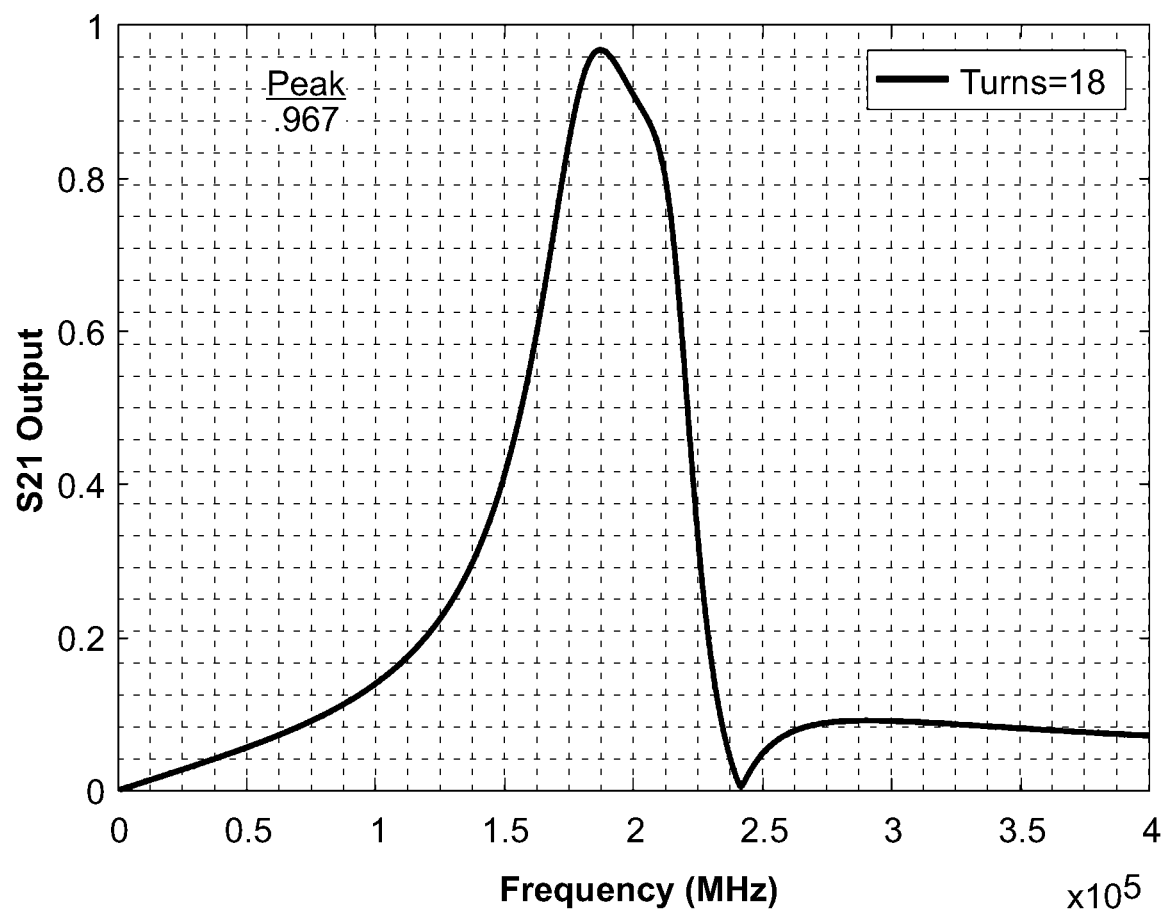
FIGS. 5A-5B are schematic diagrams illustrating the simulation results and the measured results of $S_{21}$ for frequencies up to 400 kHz.
Figure 5B:
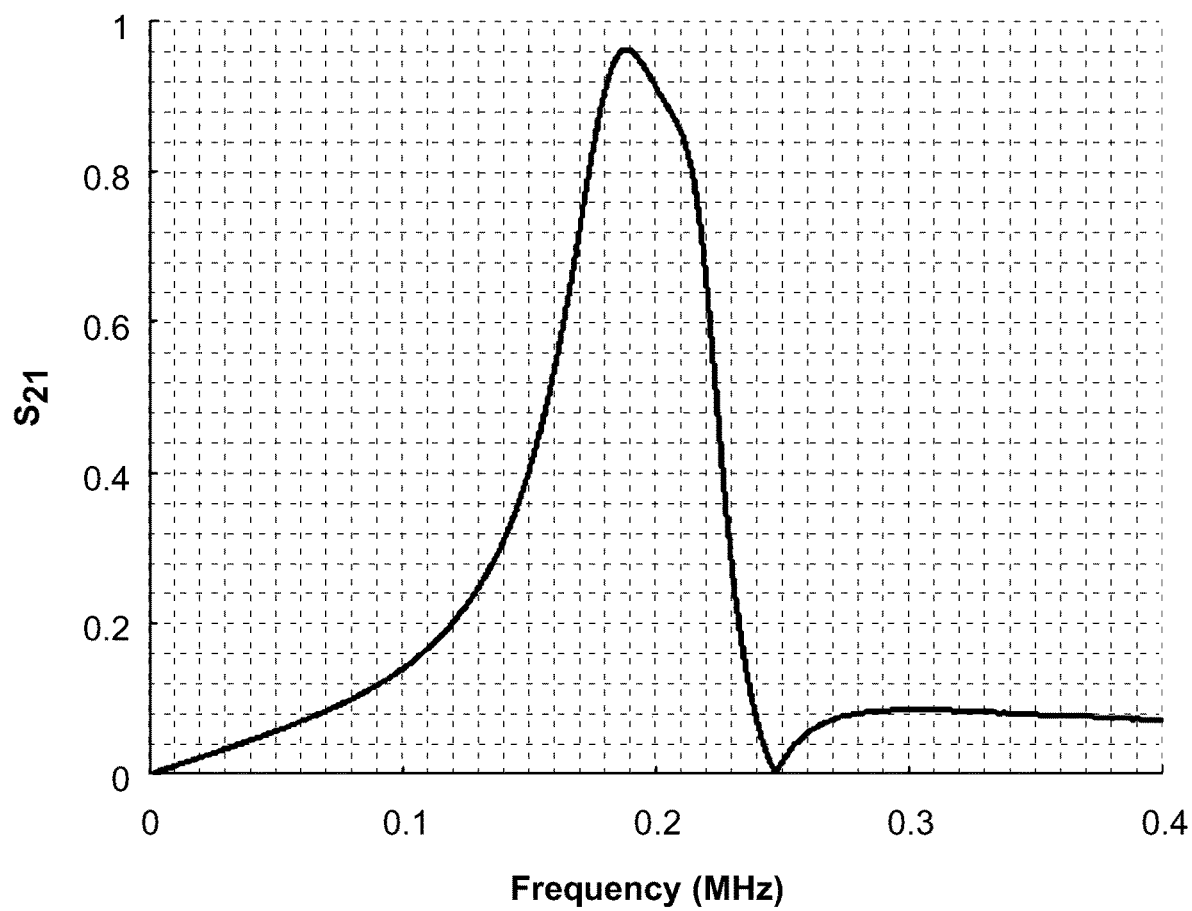

The resonant coils have been tuned to the desired frequency with capacitors of relatively minimal measured losses. The positions of all the coils are set to maximize the $S_{21}$ parameter as per simulation. The penultimate step is to measure the performance via small signal analysis. After this, the drive circuitry can be applied to the drive coil, and power measurement will be performed with 10 W through the system. FIGS. 5A-5B show the simulation results beside the measured results for frequencies up to 400 kHz. The simulations peak value is $S_{21}$=0.967, while the measurement indicates a peak value of 0.96: there is an excellent agreement between the plots.

In other embodiments of the invention, a 100 W transformer system was implemented using the same concepts described herein. Using the simulation program, a range of spatial arrangements were explored to optimize the transformer for a criterion involving maximum efficiency achieved, $S_{21}$ parameter shape, frequency of operation, power dissipation in the coils, size of the system, and the impedance characteristics of each coil. The 100 W transformer was measured to yield a 1:2.2 voltage ratio between the high frequency AC RMS at the output terminals loaded with 16Ω and the DC voltage at the input of an H-Bridge drive circuit. Its output is designed to provide 40 V and 2.5 A and the $S_{21}$ parameter efficiency is 0.96.

The drive and load coils are moderately resilient to perturbations, on the order of 5% the length of their resonant coil. The transformer was designed for a single broad optimal operating frequency peak in order to simplify tuning by the driving circuitry. The total power losses were expected to be ~8% of the output at an optimal operating frequency of 186 kHz. The measured $S_{21}$ achieved 0.96 compared to the simulated value of 0.967. Even for the high efficiency values achieved, a key observation is the excellent agreement between measurement and theory associated with the various attributes that influence the coreless transformer performance. This capability enables prediction of future coil designs with even better overall performance.

The invention provides a novel way to transferring energy inductively without using a magnetic core. The invention shows great performance when the coupling coefficients and size of the resonant coils are optimized to work with a drive coil and provide the energy needs of a load coil.

Although the present invention has been shown and described with respect to several preferred embodiments thereof, various changes, omissions and additions to the form and detail thereof, may be made therein, without departing from the spirit and scope of the invention.

What is claimed is:

1. A transformer system comprising:
    four magnetically coupled coils have a fixed spacing geometry comprising
    a drive coil;
    a load coil;
    a first resonant coil of a length X2; and
    a second resonant coil of the length X2,
    wherein a following six magnetic couplings exist between the four magnetically coupled coils: a first magnetic coupling between the drive coil and the first resonant coil, a second magnetic coupling between the first resonant coil and the second resonant coil, a third magnetic coupling between the second resonant coil and the load coil, a fourth magnetic coupling between the drive coil and the second resonant coil, a fifth magnetic coupling between the first resonant coil and the load coil, and a sixth magnetic coupling between the drive coil and the load coil;
    wherein the drive coil producing magnetic fields and the first resonant coil being magnetically coupled to the drive coil producing energy that is stored by the first resonant coil and the second resonant coil being magnetically coupled to the first resonant coil to propagate the energy stored in the first resonant coil to the second resonant coil without using a magnetic core, wherein the second resonant coil is then magnetically coupled to the load coil where the energy is transferred to the load coil, and wherein a first scaling parameter f1 is used to characterize a first variation position where the drive coil is wrapped around the first resonant coil, and a second scaling parameter f2 is used to characterize a second variation position where the load coil is wrapped around the second resonant coil, and the first scaling parameter f1 and the second scaling parameter f2 are defined as: f1=d1/X2 and f2=d2/X2, where d1 represents a first distance between a first center position of the drive coil and a first edge of the first resonant coil and d2 represents a second distance between a second center position of the load coil and a second edge of the first resonant coil, wherein any of, or a combination of, a group of parameters are picked to achieve a pre-defined transmission coefficient, and the group of parameters are the first center position, the second center position, a separation distance between the first resonant coil and the second resonant coil, a number of turns in the first resonant coil, a number of turns in the second resonant coil, a number of turns in the drive coil, and a number of turns in the load coil, wherein the first magnetic coupling between the drive coil and the first resonant coil is higher than the fourth magnetic coupling between the drive coil and the second resonant coil and the sixth magnetic coupling between the drive coil and the load coil; and wherein the third magnetic coupling between the second resonant coil and the load coil is higher than the fifth magnetic coupling between the load coil and the first resonant coil and the sixth magnetic coupling between the load coil and the drive coil.

2. The transformer system of claim 1, wherein the transformer system operates at an operating frequency picked in a range of: 100 kHz-300 kHz.

3. The transformer system of claim 1, wherein the first resonant coil and the drive coil are inductively coupled.

4. The transformer system of claim 1, wherein the second resonant coil and the load coil are inductively coupled.

5. The transformer system of claim 1, wherein the drive coil, the first resonant coil, the second resonant coil, and the load coil each have a lumped circuit representation of an LRC circuit.

6. The transformer system of claim 1, wherein the first resonant coil and the second resonant coil each are tuned to a defined frequency by a connection of a resonant capacitor.

7. The transformer system of claim 1, wherein the magnetic coupling between the four magnetically coupled coils is employed to determine transformer system's performance.

8. A method comprising:
providing four magnetically coupled coils have a fixed spacing geometry comprising a drive coil, a load coil, a first resonant coil of a length X2, and a second resonant coil of the length X2, wherein a following six magnetic couplings exist between the four magnetically coupled coils: a first magnetic coupling between the drive coil and the first resonant coil, a second magnetic coupling between the first resonant coil and the second resonant coil, a third magnetic coupling between the second resonant coil and the load coil, a fourth magnetic coupling between the drive coil and the second resonant coil, a fifth magnetic coupling between the first resonant coil and the load coil, and a sixth magnetic coupling between the drive coil and the load coil;

producing magnetic fields using the drive coil;

magnetically coupling the first resonant coil to the drive coil producing energy that is stored by the first resonant coil;

magnetically coupling the second resonant coil to the first resonant coil to propagate the energy stored in the first resonant coil to the second resonant coil without using a magnetic core, wherein the second resonant coil is then magnetically coupled to the load coil where the energy is transferred to the load coil, and wherein a first scaling parameter f1 is used to characterize a first variation position where the drive coil is wrapped around the first resonant coil, and a second scaling parameter f2 is used to characterize a second variation position where the load coil is wrapped around the second resonant coil, and the first scaling parameter f1 and the second scaling parameter f2 are defined as: f1=d1/X2 and f2=d2/X2, where d1 represents a first distance between a first center position of the drive coil and a first edge of the first resonant coil and d2 represents a second distance between a second center position of the load coil and a second edge of the first resonant coil, wherein any of, or a combination of, a group of parameters are picked to achieve a pre-defined transmission coefficient, and the group of parameters are the first center position, the second center position, a separation distance between the first resonant coil and the second resonant coil, a number of turns in the first resonant coil, a number of turns in the second resonant coil, a number of turns in the drive coil, and a number of turns in the load coil, wherein the first magnetic coupling between the drive coil and the first resonant coil is higher than the fourth magnetic coupling between the drive coil and the second resonant coil and the sixth magnetic coupling between the drive coil and the load coil; and wherein the third magnetic coupling between the second resonant coil and the load coil is higher than the fifth magnetic coupling between the load coil and the first resonant coil and the sixth magnetic coupling between the load coil and the drive coil.

9. The method of claim 8, wherein the method is implemented in a transformer system that operates at an operating frequency picked in a range of: 100 kHz-300 kHz.

10. The method of claim 8, wherein the first resonant coil and the drive coil are inductively coupled.

11. The method of claim 8, wherein the second resonant coil and the load coil are inductively coupled.

12. The method of claim 8, wherein the drive coil, the first resonant coil, the second resonant coil, and the load coil each have a lumped circuit representation of an LRC circuit.

13. The method of claim 8, wherein the first resonant coil and the second resonant coil each are tuned to a defined frequency by a connection of a resonant capacitor.

14. The method of claim 8, wherein the magnetic coupling between the four magnetically coupled coils is employed to determine transformer system's performance.

* * * * *